(No Model.) 2 Sheets—Sheet 1.

E. E. GOLD & W. H. H. SISUM.
PIPE COUPLING.

No. 466,340. Patented Jan. 5, 1892.

WITNESSES:
John Becker
C. K. Fraser

INVENTORS:
Edward E. Gold and Wm. H. H. Sisum,
By their Attorneys,
Arthur C. Fraser & Co.

(No Model.) 2 Sheets—Sheet 2.

E. E. GOLD & W. H. H. SISUM.
PIPE COUPLING.

No. 466,340. Patented Jan. 5, 1892.

WITNESSES:
John Becker
C. K. Fraser

INVENTORS:
Edward E. Gold and William H. H. Sisum.
By their Attorneys,
Arthur G. Fraser & Co.

UNITED STATES PATENT OFFICE.

EDWARD E. GOLD, OF NEW YORK, AND WILLIAM H. H. SISUM, OF BROOKLYN, ASSIGNORS TO THE GOLD CAR HEATING COMPANY, OF NEW YORK, N. Y.

PIPE-COUPLING.

SPECIFICATION forming part of Letters Patent No. 466,340, dated January 5, 1892.

Application filed January 5, 1889. Serial No. 295,498. (No model.)

*To all whom it may concern:*

Be it known that we, EDWARD E. GOLD, a citizen of the United States, residing in the city, county, and State of New York, and WILLIAM H. H. SISUM, a citizen of the United States, residing in Brooklyn, county of Kings, State of New York, have invented certain new and useful Improvements in Pipe-Couplings, of which the following is a specification.

This invention relates to couplings for joining together sections of pipe or hose, which are designed especially for coupling together the steam-heating pipes or steam or air-brake pipes of railway-cars.

One object of our invention is to provide a coupling-head which, while capable of coupling with other heads like itself, is also capable of intercoupling with so-called "Martin" couplers, being those shown in the patent of F. E. Mertens, No. 299,827, dated June 3, 1884.

Our invention is also applicable by slight modifications to many other constructions of pipe or hose couplers. It is distinguished, chiefly, by two novel features—viz., an equalizing-lever or rocking bar or ring, which is connected at its opposite ends with the other coupling-head, so that by rocking it equalizes the pressure transmitted through the two connections; also, the combination, with a connecting-link, of a throw-off lever pivoted thereto and adapted when vibrated to press the link away from the other coupling-head and thereby disengage it therefrom.

The invention also includes other features, which will be described hereinafter.

Figure 1:
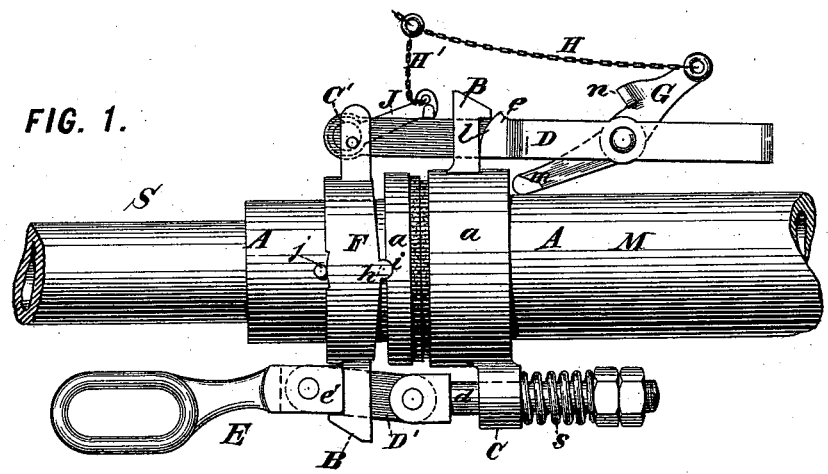
Figure 2:
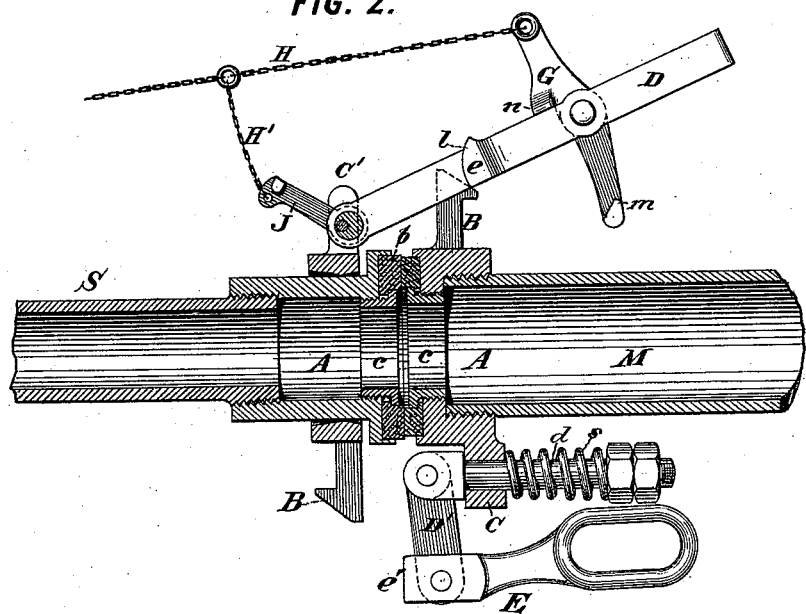
Figure 9:
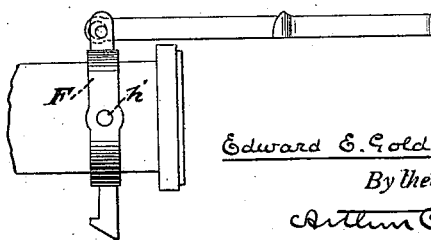
Figure 3:
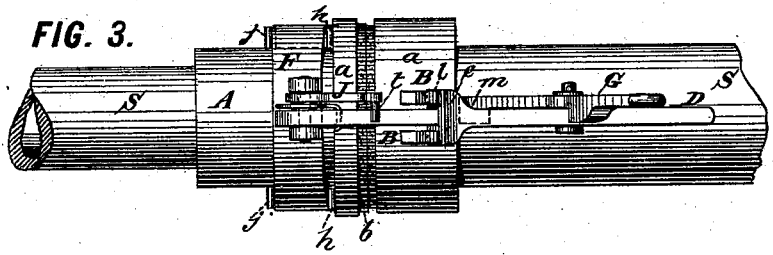
Figure 4:
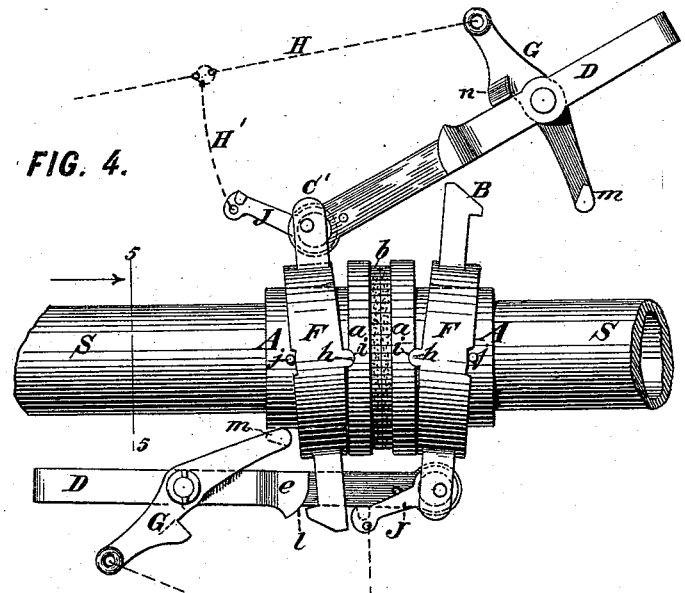
Figure 5:
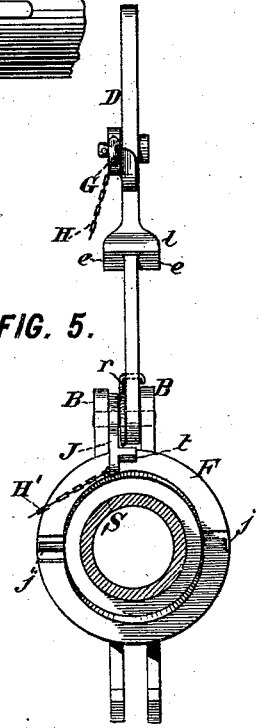
Figure 6:
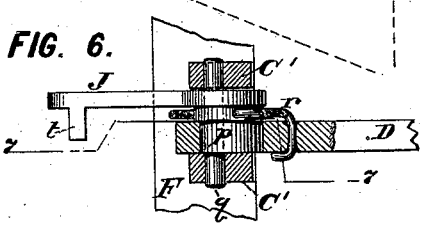
Figure 7:
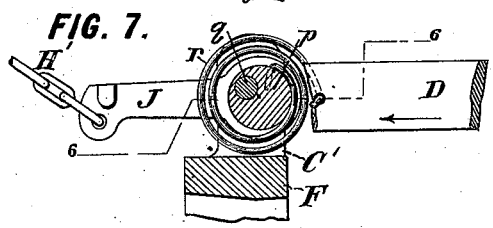
Figure 8:
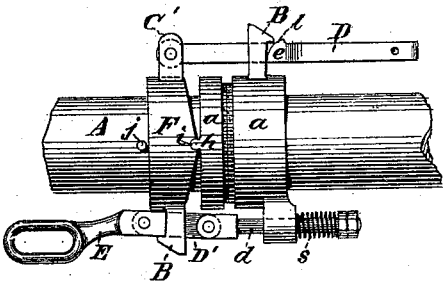

Figure 1 of the accompanying drawings is a plan or side elevation of our improved coupling-head intercoupled with a Martin coupler. Fig. 2 is a similar view in axial mid-section, showing the coupler in the process of being uncoupled. Fig. 3 is a side elevation of the coupling-heads in the position shown in Fig. 1. Fig. 4 shows two of our coupling-heads in the act of being coupled together. Fig. 5 is a section on the line 5 5 in Fig. 4, showing the link thrown up perpendicularly. Figs. 6 and 7 are enlarged detail views of the eccentric joint between the link and the equalizing-lever, Fig. 6 being a side elevation and Fig. 7 a plan, and each view being partly in section on the like-numbered line in the other. Fig. 8 is a plan of a modification shown intercoupled with a Martin coupling. Fig. 9 is a plan of another modification uncoupled.

Let M designate the Martin coupler, and S our improved coupler. The terminal portion of the pipe or section which is to be coupled we shall refer to herein as the "coupling-head." This coupling-head (lettered A) is formed in each case with a collar $a$ at its end, in which is seated a packing-ring $b$, held in place by a thimble $c$, as usual.

In the Martin coupler the collar $a$ has a pair of hooks or claws B projecting from it at one side and a lug C projecting from it at the other. A rod $d$ passes through the lug C and has a spiral spring $s$ coiled upon it, reacting at one end against the lug C and at the other end against a shoulder or head on the rod $d$, consisting, preferably, of set-nuts screwed thereon. The other end of the rod $d$ is pivoted to a link D', and to the other end of this link a cam-lever E is pivoted. In coupling together two heads thus constructed the cam-lever E is thrown from the position shown in Fig. 2 outwardly to the position shown in Fig. 1, so that its link D' passes between the two hooks on the opposite head, and the squared boss $e'$ on the cam-lever is turned into engagement with the hooks B, the spring $s$ being compressed by this movement. The collar $a$ is formed with prongs (not shown) at diametrically-opposite sides, which pass over the collar on the opposite head.

The coupling-head A of our improved coupling is formed with a short collar $a$ at its end and has an equalizing-lever F pivoted to it, preferably by means of a round projection $h$ on the front of this lever entering a similar indentation $i$ in the back face of the collar $a$. The lever F is formed with an annular portion, which passes around the body portion of the coupling-head A, being in fact a ring placed thereover and made loose enough to permit it to rock or tilt on its pivotal connection $h\ i$. It will be understood that the projection $h$ and indentation $i$ are duplicated on the opposite side of the ring. The displacement of the lever so as to bring the projection $h$ out of the indentation $i$ is prevented by a stop pin or projection $j$, fixed to the coupling-head and coming in contact with an arc-shaped face $k$ on the rear of the lever and concentric with the pivotal axis.

The lever F is formed with the twin hooks B projecting from it at one end and with a pair of lugs or ears C' projecting from it at its opposite end and corresponding in position to the lugs C of the Martin coupler. A link or link-lever D is pivoted to the lever F between the lugs C', and is formed with projections $e\ e$, Fig. 5, projecting to opposite sides. When the link is turned down in the position shown in Fig. 1, it passes between the twin hooks B on the opposite coupler, and its lateral projections $e$ are engaged by the recessed sides of the hooks. These projections are made each with a beveled face $l$, which engages the nose of the hook, so that on pulling the link D away from the center of the coupling-head this beveled face rides over the nose of the hook, and consequently frees itself therefrom. In order to thus force off the link D, a throw-off lever G is provided, which is pivoted to it and has a toe $m$ at the extremity of one arm, which, when the lever G is rocked, bears against the surface of the opposite coupling-head and presses the link D away therefrom. For better manipulating this lever G a chain H is attached to it, the other end of this chain being connected, preferably, to the car-platform or other convenient part of the car in the case of a railway-car. The lever G is prevented from rocking too far by the toe $m$ and by a lug $n$ on its opposite arm above projecting into the plane of the link D, as shown in Fig. 5, so as to strike the link and limit the motion of the lever.

When our improved coupling is coupled with a Martin coupling, as shown in Fig. 1, the one spring $s$ of the Martin coupling answers for drawing together the packing-faces $b\ b$, since the pressure of this spring is transmitted through the tilting of the equalizing-lever F to the link D, so that the latter pulls against the hooks B, with which it is engaged, with the same pressure that the cam-lever E of the Martin coupling pulls against the hooks B, with which it is engaged. To uncouple the pipes it is only necessary to throw back the Martin cam-lever E to the position shown in Fig. 2, and also (preferably by a subsequent operation) to throw out the link D of our improved coupler by pulling the chain H. The link D might be released first; but this would require a stronger pull, since the movement of the incline $l$ over the ends of the hooks B would be resisted by the spring $s$ of the Martin coupler.

According to the preferred construction of our coupler we pivot the link D to the lugs C' through the medium of an eccentric, which eccentric is fixed to or made integral with a lever J. By preference this lever J is made with an eccentric boss $p$, which fits the hole in the end of the link D. The link being slipped onto this boss up to the shoulder thereon, the two are placed between the lugs C', and a pivot-pin $q$ is put through these lugs, entering a hole through the boss $p$, which is eccentric thereto. A coiled spring $r$ is preferably employed, connected at one end to the boss $p$ and at the other end to the link D and tending to bring the lever J and link D together into the position shown in Fig. 1, in which position a lug $t$, formed on the lever J, strikes against the top of the link D and prevents the further movement of the lever J. When the lever J is turned away from the link D, as shown in Figs. 6 and 7, the lever D is thrust to the right to an extent preferably as much beyond its locked position as the extent of the overhang of the hooks B. Consequently the link D can be easily engaged with the hooks. When it has been brought to place, the operator turns the lever J over onto the link D, as shown in Fig. 1, thereby rotating the eccentric boss $p$ approximately a half-revolution, whereby the link D is drawn back to its farthest leftward position, so that it is drawn into secure engagement with the hooks B.

We would remark that the eccentric-lever is not of itself new as applied to pipe-couplings, having before been employed to draw a link into firm engagement by constituting the sole means for drawing the coupling-heads together instead of a means merely for taking up lost motion.

In uncoupling it is preferable to turn the lever J back to the position shown in Fig. 2 before throwing off the link D. For conveniently effecting this movement automatically we employ a branch chain H', connected to the end of the lever J and sufficiently shorter than the main chain so that the pulling of the one chain will first act through the branch H' to throw back the lever J, and when that lever has been moved back far enough will tighten the chain H and commence to act upon the throw-off lever G. The levers G and J will then move simultaneously until the branch H' slackens, after which, and when the lever G has ceased to act as a throw-off lever by reason of the link D having been displaced beyond its throw, the chain H acts to continue the movement of the link D until the latter is pulled back out of the way against the body of the coupling-head.

When two of our improved coupling-heads are brought together, they are coupled by first connecting the link D on one side and then connecting that on the other, the packing being drawn tightly together by turning the levers J J forward upon the links. The packings $b$ are preferably made somewhat elastic in order to make the joint tight. In some cases, if the packing-rings $b$ are too thick, or if the parts are not quite correctly proportioned, the couplings will be drawn together with sufficient force by the turning forward of only one of the levers J so that the other may be left turned back or only partly forward.

In Fig. 8 we have shown our coupler reduced to very simple construction by the admission of the throw-off lever G and the eccentric-lever J, the link D being merely pivoted to the lugs G' on the lever F.

The lever F may be pivoted or pivotally connected to the coupling-head in many different ways, either by rocking against the collar $a$ or by an independent pivotal connection. In Fig. 8 the projection $h$ is shown on the collar $a$, and the indentation $i$ is formed in the lever F. In Fig. 9 the lever F is pivoted on a pin $h'$, fixed in the body portion of the coupling-head and entirely independent of the collar $a$.

We make no claim to the specific construction of the opposite or reciprocal coupler with which our improved coupler or coupling-head is coupled; nor do we limit ourselves thereto, it being only essential to such other or reciprocal head that it shall be so constructed as to be capable of intercoupling with our improved coupler; nor do we limit ourselves to selling our improved couplers in pairs.

We claim as our invention the following defined novel features and combinations, substantially as hereinbefore specified, viz:

1. A coupler comprising a coupling-head and an equalizing-lever pivotally connected thereto, so that it may have a rocking movement thereon and adapted for connection at its opposite ends with another or reciprocal coupler, in combination with such reciprocal coupler.

2. A coupler comprising a coupling-head and an equalizing-lever pivotally connected thereto constructed at one end for engagement by a link on the other coupler, and a link pivoted to the other end of said lever and adapted for engagement with the other coupler, in combination with such other coupler.

3. A coupler comprising a coupling-head and an equalizing-lever constructed with an annular portion encircling the tubular body of the coupling-head and pivoted thereto and adapted for connection at its opposite ends with the other coupler, in combination with such other coupler.

4. A coupler comprising a coupling-head formed with a terminal collar, and an equalizing-lever constructed with an annular portion encircling the tubular body of the coupling-head, said annular portion and collar being pivoted together with a rocking connection by means of a projection formed on the one part entering a recess formed in the other, and said lever being constructed for connection at its opposite ends with the other coupler, in combination with such other coupler.

5. A coupler comprising a coupling-head formed with a terminal collar, and an equalizing-lever adapted for connection at its opposite ends with the other coupler, constructed with an annular portion encircling the tubular body of the coupling-head, the annular portion of said lever being pivoted to the collar on said coupling-head by means of a projection formed on the one entering a recess formed in the other, the said lever being formed with an arc-shaped surface opposite and concentric with said pivotal connection, and a stop projection on the coupling-head engaging said arc-shaped surface and thereby preventing displacement of the lever, in combination with such other or reciprocal coupler.

6. A coupler comprising a coupling-head and an equalizing-lever pivoted thereto, provided with a hook at one end and a link pivoted to the other end of said lever, said hook and link being constructed for connection with another coupler, in combination with such other coupler.

7. A coupler comprising a coupling-head, and a pivoted link connected thereto at one side thereof, and a throw-off lever pivoted to and borne by said link and adapted when the coupler is coupled with another coupler to be vibrated against the head thereof and by reaction thereagainst to press the link outwardly and thereby disconnect it from the opposite coupler, in combination with such opposite coupler.

8. A coupler comprising a coupling-head and an equalizing-lever pivoted thereto, formed with a hook at one end adapted for engagement by the opposite coupling-head, a link pivoted to the other end of said lever adapted to engage the opposite coupling-head, and a throw-off lever pivoted to said link and adapted when the coupling-head is coupled with another head to react against the side of the other coupling-head to press the link away from the latter and thereby disconnect it, in combination with such other coupling-head.

9. A coupler comprising a coupling-head and an equalizing-lever pivoted thereto, a link pivoted to one end of said lever, an eccentric intervening between said lever and link, and a lever for turning said eccentric in order to advance or retract the link relatively to the lever, combined with an opposite or reciprocal coupler.

10. A coupler comprising a coupling-head and an equalizing-lever pivoted thereto, a link pivoted to one end of said lever, an eccentric interposed at said pivot between the link and lever, a lever for turning said eccentric, and a spring for throwing the eccentric-lever forward against the link, combined with an opposite or reciprocal coupler.

11. A coupler comprising a coupling-head and a pivoted link connected thereto at one side thereof, a throw-off lever pivoted to said link and adapted when the head is coupled to another coupler by being vibrated against the latter to press the link outwardly in order to disconnect it from the opposite coupler, an eccentric-pivot for said link, a lever for turning said eccentric, and a pull-chain connected to said throw-off and eccentric levers, combined with such other or opposite coupler.

In witness whereof we have hereunto signed our names each in the presence of two subscribing witnesses.

EDWARD E. GOLD.
WILLIAM H. H. SISUM.

Witnesses to the signature of Edward E. Gold:
ARTHUR C. FRASER,
JNO. E. GAVIN.

Witnesses to the signature of William H. H. Sisum:
SAMUEL VAN NESS,
GEORGE H. FRASER.